US012803795B2

(12) United States Patent
Kahrobaei et al.

(10) Patent No.: US 12,803,795 B2
(45) Date of Patent: Nov. 17, 2026

(54) POST-QUANTUM HASH FUNCTIONS USING HIGHER DIMENSIONAL SPECIAL LINEAR GROUPS

(71) Applicants: Research Foundation of the City University of New York, New York, NY (US); Technion Research & Development Foundation Limited, Haifa (IL); Rector and Visitors of the University of Virginia, Charlottesville, VA (US); University of York, York (GB); Universidad de Sevilla, Seville (ES)

(72) Inventors: Delaram Kahrobaei, New York, NY (US); Corentin Le Coz, Ghent (BE); Thomas Koberda, Charlottesville, VA (US); Christopher Battarbee, York (GB); Ramon Flores, Seville (ES)

(73) Assignees: University of York (GB); Rector and Visitors of the University of Virginia, Charlottesville, VA (US); Technion Research & Dvelopment Foundation Limited (IL); Universidad de Sevilla (ES); Research Foundation of the City University of New York, New York, NY (US)

( * ) Notice: Subject to any disclaimer, the term of this patent is extended or adjusted under 35 U.S.C. 154(b) by 9 days.

(21) Appl. No.: 18/892,881

(22) Filed: Sep. 23, 2024

(65) Prior Publication Data

US 2026/0095311 A1 Apr. 2, 2026

Related U.S. Application Data

(60) Provisional application No. 63/584,526, filed on Sep. 22, 2023.

(51) Int. Cl.
*H04L 9/32* (2006.01)
*H04L 9/08* (2006.01)

(52) U.S. Cl.
CPC .......... *H04L 9/0852* (2013.01); *H04L 9/3236* (2013.01)

(58) Field of Classification Search
None
See application file for complete search history.

(56) References Cited

U.S. PATENT DOCUMENTS

2005/0175176 A1* 8/2005 Venkatesan .......... H04L 9/0643 380/42
2007/0098150 A1* 5/2007 Lauter .................. H04L 9/0643 380/28

(Continued)

OTHER PUBLICATIONS

"Gilles Zemor, Hash Functions and Cayley Graphs, 1994, Kluwer Academic Publishers, pp. 381-394." (Year: 1994).*

(Continued)

*Primary Examiner* — Amir Mehrmanesh
*Assistant Examiner* — Hassan Saadoun
(74) *Attorney, Agent, or Firm* — Schmeiser Olsen, LLP

(57) ABSTRACT

A method for securing a blockchain comprises forming a plurality of expander graphs, wherein the expander graphs provide a finite set; and obtaining from the expander graphs a post-quantum hash function that implements for quantum attack resistance a special linear group over a finite field of an order and a dimension of a matrix having a positive integer greater than or equal to 3.

17 Claims, 5 Drawing Sheets

(56) References Cited

U.S. PATENT DOCUMENTS

| | | | | |
|---|---|---|---|---|
| 2023/0198773 A1* | 6/2023 | Haney | H04L 9/3239 | 726/6 |
| 2023/0318840 A1* | 10/2023 | Zhandry | H04L 9/0643 | 713/189 |
| 2024/0048369 A1* | 2/2024 | Kam | H04L 9/0852 | |

OTHER PUBLICATIONS

Le Coz, C. ; et al.; Post-quantum hash functions using SLn(Fp); Cryptography and Security; Jul. 8, 2022; 18 pages; https://doi.org/10.48550/arXiv.2207.03987.

Bromberg, L. et al.; Navigating in the Cayley Graph of SL2(Fp) and Applications to Hashing; Semigroup Forum; Dec. 9, 2015; pp. 314-324; vol. 94; https://doi.org/10.1007/s00233-015-9766-5.

Charles, D. et al.; Cryptographic Hash Functions from Expander Graphs; J. Cryptol.; Sep. 15, 2007; pp. 93-113; DOI: 10.1007/s00145-007-9002-x.

Grassl,M.; Cryptanalysis of the Tillich-Zemor Hash Function; J. Cryptol.; Mar. 16, 2010; pp. 148-156; DOI: 10.1007/s00145-010-9063-0.

Shpilrain, V, et al.; Compositions of linear functions and applications to hashing; Groups; May 2016; 10 pages; DOI: 10.1515/gcc-2016-0016.

Tomkins, H. et al.; New Zémor-Tillich Type Hash Functions Over GL2 (F9N); J. Math. Cryptol.; Aug. 1, 2020; pp. 236-253; vol. 14, No. 1; https://doi.org/10.1515/jmc-2019-0033.

Sterner, B.; Commitment Schemes from Supersingular Elliptic Curve Isogeny Graphs; Mathematical Cryptology; Mar. 28, 2022; 15 pages; vol. 1, No. 2.

Pizer, A.; Ramanujan Graphs and Kecke Operators; Bull. Amer. Math. Soc.; Jul. 1990; pp. 127-137; vol. 23, Issue 1.

Bekka, B. et al.; Kazhdan's Property (T); Cambridge University Press; 2008; 13 pages; https://doi.org/10.1017/CBO9780511542749.

Lubotzky, A.; What is . . . Property (τ)?; Notices of the American Mathematical Society; Jun. 2005; pp. 636-627; vol. 52, No. 6.

Guralnick, R.; Small Representations Are Completely Reducible; Journal of Algebra; Oct. 15, 1999; pp. 531-541; vol. 220, Issue 2; https://doi.org/10.1006/jabr.1999.7963.

Tinani, S.; Methods for Collisions in Some Algebraic Hash Functions; cs.cr; May 31, 2023; 16 pages; https://doi.org/10.48550/arXiv.2305.18799.

Alon, N. et al.; Non-backtracking random walks mix faster; Communications in Contemporary Mathematics; Aug. 2007; pp. 585-603; vol. 9, issue No. 4.

Bellare,M. et al.; Random Oracles are Practical: A Paradigm for Designing Efficient Protocols; CCS '93: Proceedings of the 1st ACM conference on Computer and communications security; Dec. 1, 1993; pp. 62-73; https://doi.org/10.1145/168588.168596.

Tillich, J. et al.; Hashing with SL2; Advances in Crypotology—CRYPTO '94, LNCS 839, 1994; pp. 40-49.

Faugere, J. et al.; New Subexponential Algorithms for Factoring in SL(2,F2n); 2011; IACR Cryptology ePrint Archive. 2011. 598.

Steven, M. et al.; The first collision for full SHA-1; Cryptology {ePrint} Archive; 2017; 23 pages; https://eprint.iacr.org/2017/190.

Lubotzky, A.; Ramanujan Graphs; Combinatorica; Sep. 1988; pp. 261-277; vol. 8.

Arzhantseva, G. et al.; Logarithmic Girth Expander Graphs Of SLn(Fp); Journal of Algebraic May 22, 2022; pp. 691-723; https://doi.org/10.1007/s10801-022-01128-z.

Golsefidy, A. et al.; Expansion in perfect groups; Geometric and Functional Analysis; Aug. 24, 2011; 62 pages; DOI:10.1007/s00039-012-0190-7.

Sardari, N.; Complexity of Strong Approximation on the Sphere; International Mathematics Research Notices; Oct. 31, 2019; pp. 13839-13866; vol. 2021, Issue 18; https://doi.org/10.1093/imrn/rnz233.

Federov, A. et al.; Quantum computers put blockchain security at risk; Nature; Nov. 22, 2018; pp. 465-467; vol. 563.

Tillich, J. et al.; Collisions for the LPS Expander Graph Hash Function; Advances in Cryptology—EUROCRYPT 2008; pp. 254-269; https://doi.org/10.1007/978-3-540-78967-3_15.

Chen, J. et al.; Application of Homomorphic Encryption in Blockchain Data Security; EITCE '20: Proceedings of the 2020 4th International Conference on Electronic Information Technology and Computer Engineering; Feb. 1, 2021; pp. 205-209; https://doi.org/10.1145/3443467.3443754.

Sosnovski, B.; Recent Developments in Cayley Hash Functions; Mathematical Software; Jul. 14, 2018; 10 pages; https://doi.org/10.1007/978-3-319-96418-8_52.

* cited by examiner

POST-QUANTUM HASH FUNCTIONS USING HIGHER DIMENSIONAL SPECIAL LINEAR GROUPS

RELATED APPLICATIONS

This application claims priority to U.S. Provisional Application Ser. No. 63/584,526 filed Sep. 22, 2023, entitled "POST-QUANTUM HASH FUNCTIONS USING HIGHER DIMENSIONAL SPECIAL LINEAR GROUPS," the entirety of which is incorporated by reference herein.

STATEMENT REGARDING FEDERALLY FUNDED RESEARCH FOR DEVELOPMENT

This invention was made with government support under grant number DMS-2002596 awarded by National Science Foundation and grant number ONR 62909-24-1-2002 awarded by the Office of Naval Research. The government has certain rights in the invention.

FIELD

The present concepts relate generally to quantum computing cybersecurity, and more specifically, to cryptographic hash functions that are resistant to quantum attacks.

BACKGROUND

Modern quantum technology is implemented to solve mathematical problems. Quantum computers are becoming sufficiently sophisticated to attack cryptography algorithms, blockchains, and the like.

It is desirable for a post-quantum cryptographic system to include computational tools that are resistant to cyberattacks, and more specifically, secure encryption techniques such as hash functions to counter against an attack by a quantum and/or conventional digital computer constructed to crack or circumvent cryptocurrency and blockchain data blocks. It is also desirable to modernize existing hash functions and update algorithms and to adapt them to the design and security of consensus-based mechanisms such as blockchains so that they are suitable for post-quantum cryptography, i.e., a hash function having quantum-proof or quantum-resistant properties.

SUMMARY

Provided in one aspect is a method for obtaining a securing a blockchain, comprising: forming a plurality of expander graphs, wherein the expander graphs provide a finite set; and obtaining a post-quantum hash function that implements for quantum attack resistance a special linear group over a finite field of an order and a dimension of a matrix having a positive integer greater than or equal to 3.

In another aspect, a hash function comprises a scheme with hash functions that use Cayley graphs of a special linear group $SL_n(\mathbb{F}_p)$ as platforms, where p is prime and $n \geq 3$, wherein corresponding groups of the fields $\mathbb{F}_p$ are quotients of $SL_n(Z)$.

In another aspect, a method for encrypting a blockchain includes generating a post-quantum hash function that implements for quantum attack resistance a special linear group over a finite field of an order and a dimension of a matrix having a positive integer greater than or equal to 3; and encrypting a blockchain with the post-quantum hash function.

In another aspect, a computer program product comprises a computer readable hardware storage device storing a computer readable program code, the computer readable program code comprising an algorithm that when executed by a computer processor of a computer system implements a method for securing a blockchain, comprising: forming a plurality of expander graphs, wherein the expander graphs provide a finite set; and obtaining from the expander graphs a post-quantum hash function that implements for quantum attack resistance a special linear group over a finite field of an order and a dimension of a matrix having a positive integer greater than or equal to 3.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention. In the drawings.

DETAILED DESCRIPTION

In brief overview, embodiments of the present inventive concept provide a hash function for which there is considerable evidence of resistance to quantum attacks. Such functions are highly important in computing and cybersecurity, and they form the basis of blockchain technology. Strong hash functions that resist quantum attacks will be necessary with the continued development of quantum computers. In some embodiments, this is achieved by defining new families of Tillich-Zémor hash functions, using higher dimensional special linear groups over finite fields as platforms, in particular, where $n \geq 3$. The Cayley graphs of these groups combine fast mixing properties and high girth, which together give rise to good preimage and collision resistance of the corresponding hash functions. The unique hash functions are post-quantum secure.

As described above, there is a general need for computational tools that are resistant to quantum attacks. Nature Magazine published an article in November, 2018 entitled "Quantum computers put blockchain security at risk" by Aleksey K. Fedorov, Evgeniy O. Kiktenko and Alexander I. Lvovsky, incorporated by reference herein in its entirety, underscores the urgent need for computational tools that are resistant to attacks by quantum algorithms. Such a tool is described herein, and its usefulness is likely to only increase with time as quantum computing proliferates and strengthens.

Figure 1:
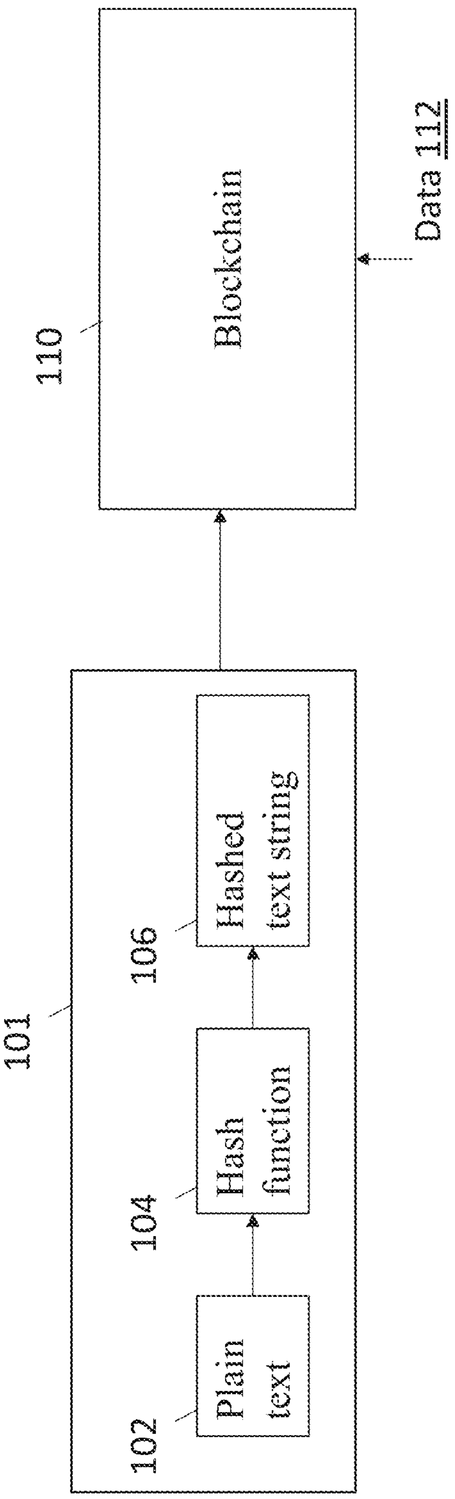
FIG. 1 is a block diagram of a system including a hash function generator and a blockchain network, in which embodiments of the present inventive concept can be practiced.

FIG. 1 is a block diagram of a system including a quantum-secure hash system 101 and a blockchain 110, in which embodiments of the present inventive concept can be practiced.

The hashing system 101 receives an input 102, for example, plain text having a variable length, and generates an output 106 having a fixed length, for example, 256 bits but not limited thereto. The input data can be transformed by a hash function 104, which maps the input data to a range of values for quick and efficient lookup purposes. In some embodiments, the hash function 104 complies with a hashing algorithm such as SHA-256 or the like. For example, in a cryptocurrency system, the input 102 may include data transaction information, for example, a transfer involving a monetary value, that is executed by a hash function 104. In doing so, the hash function 104 can apply a series of mathematical operations to the input 102, resulting in an output 106 comprising a fixed-length string of characters. The hash output 106 may be received by a blockchain 110, for example, implemented in a data communication network such as a cellular network, telecommunications network, and so on, and is used to secure the data 112 in the blockchain 110, for example, cryptocurrency, and ensure that the data 112 contained in the blocks of the blockchain 110 is not altered.

The hash output 106 is unique to the input 102 and can therefore maintain data integrity and prevent fraudulent transactions. In particular, the input data cannot be altered because it will change the hash value. In blockchain applications, hashing ensures integrity by adding each block to the hash of its previous block. Each block is hashed individually. But all the blocks are correlated. The first data block is hashed and fed to the second block as input. The output hash of the second block is provided to the third block as input. This process carries on until the last block. The final output is the combination of all the data blocks. Thus, each block contains a new hash and the previous hash. Therefore, the blockchain contains a series of blocks where any alteration to the block will necessitate changes in a hash and subsequent hash in the block. This interdependency ensures the integrity of hashing in blockchain.

In some embodiments, the hash function 104 is tamper resistant. Each input 104 has its own unique hash, so it is highly improbable for two distinct inputs to generate the same hash value. In the realm of blockchain, this feature ensures that each block possesses a unique identifier. The role of the hash function 104 is to receive a message as input and output a random value in a manner that does not hide the content of the message. A pair of separate messages in the same hash table may experience a collision (i.e. where the same hash value is produced for two different inputs,) and a secure hash function must be able to withstand (i.e., be collision-resistant) attacks that attempt to discover collisions, i.e., when two different messages in a hash table produce the same hash value. If collisions were frequent, it could introduce vulnerabilities wherein disparate data sets yield identical hashes, jeopardizing the integrity of the blockchain system. The hash function 104 has two properties: collision resistance and preimage resistance. the post-quantum collision resistance hash function 104 can address situations where bad actors desire to apply a quantum attack to the hash function 104.

In some embodiments, the hash functions 104 are obtained from families of expander graphs first introduced in "Cryptographic hash functions from expander graphs" by Denis Charles, Kristin Lauter, and Eyal Goren. (hereinafter referred to as "Charles-Lauter-Goren" in Journal of Cryptology, 22:93-113, 12 2008, incorporated by reference herein in its entirety. The Charles-Lauter-Goren scheme in turn was inspired by a scheme developed by Jean-Pierre Tillich and Gilles Zémor (hereinafter "Tillich-Zemor"). "Group-theoretic hash functions." In Algebraic coding (Paris, 1993), volume 781 of Lecture Notes in Comput. Sci., pp. 90-110. Springer, Berlin, 1994, incorporated by reference herein in its entirety. The Charles-Lauter-Goren scheme considered specific families of expander graphs discovered by Lubotsky, Phippips, and Sarnak. "Ramanujan Graphs," Combinatorica, 8 (1988), and A.K. Pizer, "Ramanujan graphs and Hecke operators," Bull. Amer. Math. Soc. (N.S.), 1990, each incorporated by reference herein in its entirety. The Charles-Lauter-Goren construction is quite general, and can be applied to any expander family in which finding cycles is hard, and thereby furnishes collision resistant hash functions. Such hash functions are of interest with respect to blockchains. See for example, "Applications of homomorphic cryptographic primitives in blockchain and the internet of things," Undergraduate Thesis, University of York, 2020., by Tom Borthwick, incorporated by reference herein in its entirety, and in light of the recently proved practicality of finding collisions in the SHA-1 hashing Algorithm, described in "The first collision for full SHA-1. In Advances in cryptology" CRYPTO 2017. Part I, volume 10401 of Lecture Notes in Comput. Sci., Springer, Cham, 2017 by Marc Stevens, Elie Bursztein, Pierre Karpman, Ange Albertini, and Yarik Markov, incorporated by reference herein in its entirety. Other schemes have been proposed, including Shpilrain and Sosnovski. "Compositions of linear functions and applications to hashing," Groups Complex. Cryptol (2016), Ghaffari and Mostaghim, "More secure version of a Cayley hash function". Groups Complex. Cryptol (2018), and Sosnovski, "Recent developments in Cayley hash functions," Mathematical software—ICMS 2018 Lecture Notes in Comput. Sci. (2018), each incorporated by reference herein in its entirety.

Interest in hash functions based on novel platforms fits into the context of recent efforts to modernize existing hash functions, and to adapt them to the design and security of hash-based consensus mechanisms, most notably with respect to blockchains and especially in light of the recently proved practicality of finding collisions in the SHA-1 hashing algorithm.

The general idea behind Tillich-Zemor hash functions is the following. Fixing a base vertex, the input of the hash function is interpreted as a sequence of instructions, resulting in a non-backtracking path in a d-regular graph. The output of the hash function is the endpoint vertex of the path. More precisely, the input 102 can be a string of numbers in: $[d-1]:=\{1, 2, \ldots d-1\}$ of arbitrary length, and the output 106 can be the vertex obtained by performing a simple walk starting at a base vertex, using the elements of $[d-1]$ as transition data for subsequent steps in the walk, described in greater detail below.

A hash function 104 in accordance with embodiments of the present inventive concept generally has two main features. The first is preimage resistance, which means that given a point in the hash value, it is computationally hard to find an input that maps to that hash value. Preimage attacks may occur where an attacker successfully generates an input that produces a desired hash output. The second is collision resistance, which requires the problem of finding distinct inputs with the same output to be computationally difficult.

Figure 2:
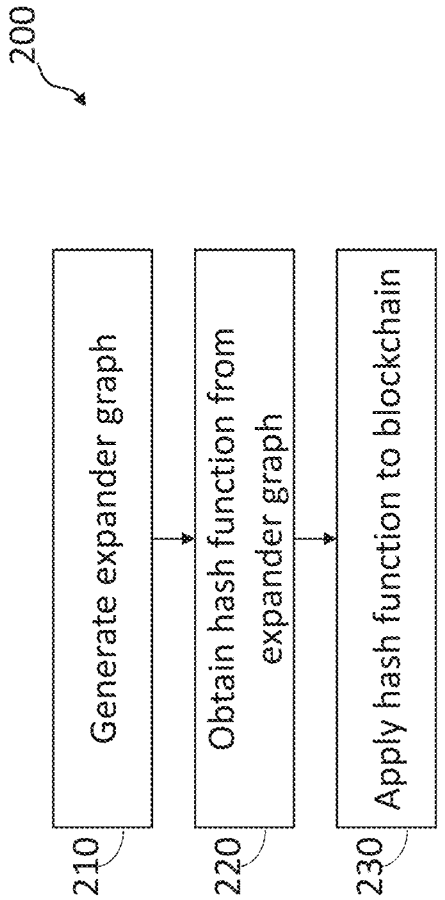
FIG. 2 is a flow diagram of a method for generating a post-quantum hash function, in accordance with some embodiments.

FIG. 2 is a flow diagram of a method 200 for generating a post-quantum hash function, in accordance with some embodiments. The method 200 can be applied to a computational tool that is resistant to attacks by quantum algorithms or the like.

At step 210, at least one expander graph is generated. In some embodiments, the at least one expander graph includes a Cayley graph. In some embodiments, the graph includes a Lubotzky-Phillips-Sarnak expander graph. Other expander graphs may equally apply.

At step 220, a hash function is obtained from the expander graph. For example, Cayley graphs can combine fast mixing properties and high girth, which together give rise to good preimage and collision resistance of the corresponding hash functions.

At step 230, the hash function is applied to a blockchain. The hash function is important in public key cryptography within the blockchain, for example, with respect to finding collisions in a SHA-1 hashing algorithm. Public keys and digital signatures can be generated through the hash function and provide a secure way for participants to verify their ownership of assets because the hashing creates interdependence among blocks, which safeguards alterations and maintains the integrity of the blockchain.

As described above, some embodiments include a novel scheme, where the hash functions use Cayley graphs of the special linear groups SLn(Fp) as platforms, where Fp is a finite field of a prime order (p), and where p is a prime and n is a dimension of matrices where $n \geq 3$, as distinguished from conventional schemes where n=2, which is prone to collisions. This novel scheme is a post-quantum construction that uses a higher dimension, i.e., $n \geq 3$. The restriction to the fields Fp comes from the fact that the corresponding groups will be obtained as quotients of SLn(Z). A crucial observation is that, in schemes using these groups as a platform, the problem of finding a preimage or a collision corresponds to finding factorizations of the identity matrix with prescribed factors. Also considering may include recent work of Arzhantseva and Biswas entitled "Logarithmic girth expander graphs of SLn(Fp)." Journal of Algebraic Combinatorics, 2022, incorporated by reference herein in its entirety, which concerns the expanding properties of the Cayley graphs of these groups.

In addressing the preimage resistance feature of a hash function in accordance with some embodiments, collected may include the expansion properties (see step 330 of FIG. 3) the family of Cayley graphs {Gn,p}p of the groups SLn(Fp), where $n \geq 3$ is fixed and where p tends to infinity. Expansion in this family of graphs guarantees good mixing properties, because under these conditions the random walk gives a good approximation to the uniform distribution after O(log p) steps. In particular, the likelihood of success of an indistinguishability attack is strictly bounded, and tends to ½ as the order of the group tends to infinity (see Proposition 3 below).

In addressing the collision resistance feature of a hash function, the strength of a hash function in accordance with some embodiments with respect to collision resistance is mainly based on the absence of small cycles in the Cayley graphs of the {Gn,p}p on the order of log p. It follows that a factorization of the identity, which is easily seen to be equivalent to finding a collision for the hash function, is in turn equivalent to solving over a system of $n^2$ equations in a number of variables that is O(log p), over the field Fp. In full generality, solving such systems of equations is NP-hard. Replacing the problem of factoring the identity with the problem of factoring an arbitrary group element yields a similar system of equations, lending further evidence of resistance of the hash function to finding preimages, described in greater detail below.

For conventional n=2, certain Cayley graphs of the groups PSL2(Fp) give rise to the Lubotzky-Phillips-Samak expander graphs, for example, described in Alex Lubotzky, Ralph S. Phillips, and Peter C. Sarnak entitled "Ramanujan graphs." Combinatorica, 8(3):261-277, 1988 incorporated by reference herein in its entirety, were then used to build Goren-Lauter-Charles type hash functions described in "Cryptographic hash functions from expander graphs." Journal of Cryptology, 22:93-113, 12 2008 incorporated by reference herein in its entirety, A successful collision attack (i.e., an efficient computation of a collision) was found in Jean-Pierre Tillich and Gilles Zémor. "Collisions for the LPS expander graph hash function." In Proceedings of the Theory and Applications of Cryptographic Techniques 27th Annual International Conference on Advances in Cryptology, EUROCRYPT'08, page 254-269, Berlin, Heidelberg, 2008 incorporated by reference herein in its entirety, by taking coefficients in Z[i] and then reducing to a system of equations of degree two. More recently, Naser T. Sardari. "Complexity of strong approximation on the sphere" Int. Math. Res. Not. IMRN, (18):13839-13866, 2021 incorporated by reference herein in its entirety, attacked preimage resistance by designing a polynomial-time algorithm that represents a number as a sum of four squares with some restricted congruence conditions. However, in the above conventional offerings where the dimension n=2, collision resistance is prevalent. As described herein, embodiments of the present inventive concepts do not experience collision resistance because the dimension n=3 or greater, and is not equal to 2. The essentially different nature of higher dimensional special linear groups gives evidence of additional security, and makes it likely that these attacks are far more difficult to execute for the hash functions in accordance with embodiments herein. Considering symmetric generating sets enables one to employ results from the theory of simple random walks in simplicial graphs. Nevertheless, the fact that it is restricted to non-backtracking random walks precludes the use of multiplicativity of the hash function, and thus complicates parallel computation. These issues are described in greater detail under the "Multiplicativity and parallel computing" section below.

Definition of Hash Functions

For general results about special linear groups over finite fields, an example can be found in "Lie groups, Lie algebras, and representations," volume 222 of Graduate Texts in Mathematics by Brian Hall. Springer, Cham, second edition, 2015. incorporated by reference herein in its entirety. In some embodiments, a number of properties may be established, for example, described in "Logarithmic girth expander graphs of SLn(Fp)" by Goulnara Arzhantseva and Arindam Biswas. Journal of Algebraic Combinatorics, 2022 incorporated by reference herein in its entirety, the results of which can be summarized in the following theorem:

With regard to the Arzhantseva-Biswas theorem, incorporated by reference above, let $n \geq 2$ and let p a prime. Write $\pi_p$: $SL_n(Z) \rightarrow SL_n(Fp)$ for the canonical projection given by reduction modulo p. There exist matrices $\tilde{A}, \tilde{B} \in SL_n(Z)$ such that:

(i) There exists a prime $p_0$ such that for all $p > p_0$, the matrices $\tilde{A}_p := \pi_p(A)$ and $\tilde{B}_p := \pi_p(\tilde{B})$ generate $SL_n(Fp)$.

(ii) If $(\tilde{A}, \tilde{B})$ is the subgroup generated by $\tilde{A}$ and $\tilde{B}$ inside of $SL_n(Z)$, then $(\tilde{A}, \tilde{B})$ is isomorphic to $F_2$, the free group of rank two.

(iii) The diameter of the Cayley graph $G_{n,p}$ of $SL_n(Fp)$ with respect to $\{\tilde{A} \pm p\ 1, \tilde{B}\ p \pm 1\}$ is O(log p).

Observe that for n≥3, items (i) and (ii) above reflect the fact that the subgroup of $SL_n(Z)$ generated by Ã and B̃ is usually a thin subgroup of $SL_n(R)$. The fact that $\tilde{A}_p$ and $\tilde{B}_p$ generated the corresponding finite quotients for all but finitely many values of p reflect strong/superstrong approximation. In turn, item (iii) implies that the girth of $G_{n,p}$ is optimal, because the graphs $\{G_{n,p}\}_p$ form a family of expander graphs (see proposition below, which states for n≥3 fixed and p→∞, the sequence $\{G_{n,p}\}_p$ is a family of expander graphs).

In some embodiments, when using the Cayley graphs Gn,p as a platform, n is considered to be fixed and p as modulating the level of security, with the trade-off being that the hash functions become more expensive to compute for large p. Possible choices for A and B are given by:

$$\tilde{A}=\begin{pmatrix}1&a&0&0&\dots&0\\0&1&a&0&\dots&0\\0&0&1&a&\dots&0\\\vdots&&&&&\vdots\\&&&&\dots&a\\0&0&0&0&\dots&1\end{pmatrix},\ \tilde{B}=\begin{pmatrix}1&0&0&\dots&&0\\b&1&0&\dots&&0\\0&b&1&\dots&&0\\0&0&b&\dots&&0\\\vdots&&&&\vdots&\vdots\\0&0&0&\dots&b&1\end{pmatrix}\in SL_n(\mathbb{F}_p),$$

with a; b≥2. These matrices will be crucial in the description of the hash function herein.

In order to implement the Charles-Lauter-Goren construction, embodiments of the present inventive concept apply the desirable mixing properties of the expander graphs.

For n≥3 fixed and p→∞, the sequence $\{G_{n,p}\}_p$ is a family of expander graphs.

By item (i) of the theorem above (prime $p_0$), there exists a prime $p_0$ such that for all $p\geq p_0$, the matrices $\tilde{A}_p:=\pi_p(\tilde{A})$ and $\tilde{B}_p:=\pi_p(\tilde{B})$ generate $SL_n(F_p)$. Since $SL_n(Z)$ has property (T) for n≥3 (see "New Mathematical Monographs" by Bachir Bekka, Pierre de la Harpe, and Alain Valette. Kazhdan's Property (T). Cambridge University Press, 2008 incorporated by reference herein in its entirety). Also, $SL_2(Z)$ has property (τ) with respect to the family of congruence subgroups, see Alex Lubotzky. "What is: . . . property(τ)?" Notices Amer. Math. Soc., 52(6):626{627, 2005 incorporated by reference herein in its entirety, the following proposition is applied:

An immediate consequence of this proposition is that the random walk approximates the uniform distribution after O(logp) steps in the corresponding graph $G_{n,p}$. As elaborated herein, this result is relevant for the purpose of analyzing preimage resistance to indistinguishability attacks; see the example under the mixing property description below. In "Navigating in the Cayley graph of SL2(Fp) and applications to hashing" but Lisa Bromberg, Vladimir Shpilrain, and Alina Vdovina. Semigroup Forum, 94(2):314{324, 2017 incorporated by reference herein in its entirety, random walks are conducted on Cayley graphs with respect to non-symmetric generating sets, and thus their asymptotic behavior is less clear. Similar issues arise in "New Tillich-Zémor type hash functions over $GL2(F_{pn})$" by Hayley Tomkins, Monica Nevins, and Hadi Salmasian. J. Math. Cryptol., 14(1):236{253, 2020 incorporated by reference herein in its entirety, since the hash values could be restricted to a proper subgroup. As stated in Goulnara Arzhantseva and Arindam Biswas. Logarithmic girth expander graphs of $SL_n$(Fp). Journal of Algebraic Combinatorics, 2022 incorporated by reference herein in its entirety, one can effectively compute the bound lower $p_0$. No explicit bound on $p_0$ has been given, though by combining existing results one can probably prove that p need not be very large, likely on the order of magnitude of n; see for instance "Expansion in perfect groups" by Alireza Salehi Golsefidy and Peter P. Varju. Geom. Funct. Anal., 22(6): 1832{1891, 2012 and "Small representations are completely reducible" by Robert M. Guralnick. J. Algebra, 220(2): 531{541, 1999, each incorporated by reference herein in its entirety. Note that the larger the value of the prime p, the more secure the hash function.

General Construction

Next, matrices given in Arzhantseva and Biswas incorporated by reference herein are used to define an explicit family of hash functions. In some embodiments, a special linear group-based hash functions is as follows. Let n≥3 and let p be a prime number. Let a,b,l≥2 that satisfy:

If n=3, a≡1(mod3), b≡−1(mod3) and $l=4^k$ for some positive integer k.

If n≥4, there exists a prime q such that n≡a≡b≡1(mod q) and l is at least 3(n−1) and is of the form $q^{k+1}+1$ for some integer k.

Consider the matrices Ã and B̃ described above. In the following, denoted is $A\equiv\tilde{A}^l$ and $B\equiv\tilde{B}^l$. The notation [k] is used to denote the set of integers in [k], and [k]* to denote the set of finite strings of integers in [k]. The hash function ϕ: [3]*→$SL_n(F_p)$ is defined. One begins with choosing bijections s: [4]→$\{A^{\pm1},B^{\pm1}\}$, $s_\lambda$: [3]→$\{A^{\pm1},B^{\pm1}\}s(\lambda)$ for each λ ∈ [4]. Then, given $x=(x_i)_{1\leq i\leq k}\in[3]_k$, the following inductive definition is determined:

$$*B_1=s(x_1),$$

$$*B_i=s_\lambda(x_i)\text{ with }\lambda=s^{-1}(B_{i-1}^{-1}),\text{ for }2\leq i\leq k.$$

Finally, $\phi(x):=B_1\dots B_k\ \varepsilon\ SL_n(F_p)$ is set.

Note that $G_{n,p}$ is 4-regular, so that after the first bit $x_1$ of the input x, there are exactly three non-backtracking edges in the graph by which to proceed. The input x can thus be viewed as encoding a reduced word in the free group $F_2$. The lack of backtracking in the resulting walk on $G_{n,p}$ is crucial for the avoidance of collisions, as well as for the reduction of mixing time.

As stated in Arzhantseva and Biswas incorporated by reference herein, the elements {A,B}generate a free subgroup of $SL_n(Z)$ and generate $SL_n(F_p)$ for all but finitely many values of p, and these facts give rise to strong preimage and collision resistance of the resulting hash functions.

A family of concrete examples of hash functions are provided as follows, which are constructed for the specific values a=4, b=2 and l=4. It is not known what minimal value of n would ensure security.

Example 1: Let p be a prime, and let $$A=\begin{pmatrix}1&4&0&0&\dots&0\\0&1&4&0&\dots&0\\0&0&1&4&\dots&0\\\vdots&&&&&\vdots\\&&&&\dots&4\\0&0&0&0&\dots&1\end{pmatrix}^4,\ B=\begin{pmatrix}1&0&0&\dots&&0\\2&1&0&\dots&&0\\0&2&1&\dots&&0\\0&0&2&\dots&&0\\\vdots&&&&\vdots&\vdots\\0&0&0&\dots&2&1\end{pmatrix}^4\in SL_n(\mathbb{F}_p),$$

Let s(1)=A, s(2)=B, $s(3)=A^{-1}$, $s(4)=B^{-1}$. The functions $\{s_\lambda\}_{\lambda\in[4]}$ can be defined follows:

$$s_1(1)=B,\ s_1(2)=A^{-1},\ s_1(3)=B^{-1},$$
$$s_2(1)=A,\ s_2(2)=A^{-1},\ s_2(3)=B^{-1},$$
$$s_3(1)=A,\ s_3(2)=B^{-1},\ s_3(3)=B,$$
$$s_4(1)=A,\ s_4(2)=A^{-1},\ s_4(3)=B,$$

Given an input sequence $x=\{x_i\}_{i\in[1,k]}\in[3]^k$, inductively defined are:

$$*B_1=s_1(x_1)$$
$$*B_i=s_\lambda(x_i)\text{ with }\lambda=s^{-1}(B_{i-1}^{-1}),\text{ for each }k\in[2,k].$$

Then, the sequence x is hashed to the matrix:

$$\phi(x)=B_1\cdots B_k.$$

Thus, a hash function is obtained for every n>3.

In another example, with n=3 we have:

$$A=\begin{pmatrix}1&16&96\\0&1&16\\0&0&1\end{pmatrix},\ B=\begin{pmatrix}1&0&0\\8&1&0\\24&8&1\end{pmatrix}\in SL_2(\mathbb{F}_p),$$

For example, considering the sequence 2232221, the following procedure is applied to obtain the sequence:

$B_1=s_1(2)=A^{-1}$ $B_2=s_1(2)=A^{-1}$, where we use the map $s_1$ because $B_1^{-1}=s(1)$ $B_3=s_1(3)=B^{-1}$, where we use the map $s_1$ because $B_2^{-1}=s(1)$ $B_4=S_2(2)=A^{-1}$, where we use the map $s_2$ because $B_3^{-1}=s(2)$ $B_5=s_1(2)=A^{-1}$, where we use the map $s_1$ because $B_4^{-1}=s(1)$ $B_6=s_1(2)=A^{-1}$, where we use the map $s_1$ because $B_5^{31}$ ı=s(1)

$B_7=s_1(1)=B$, where we use the map $s_1$ because $B_6^{-1}$=s(1)

Finally, x is mapped to $B_1, B_2 \ldots B_7$ $$\Phi(x)=A^{-2}B^{-1}A^{-3}B=\begin{pmatrix}694190977&233260720&29297952\\-38379648&-12896255&-1619792\\1191936&400512&50305\end{pmatrix}\in SL(\mathbb{F}_p).$$

Properties of the Constructed Hash Functions

Figure 3:
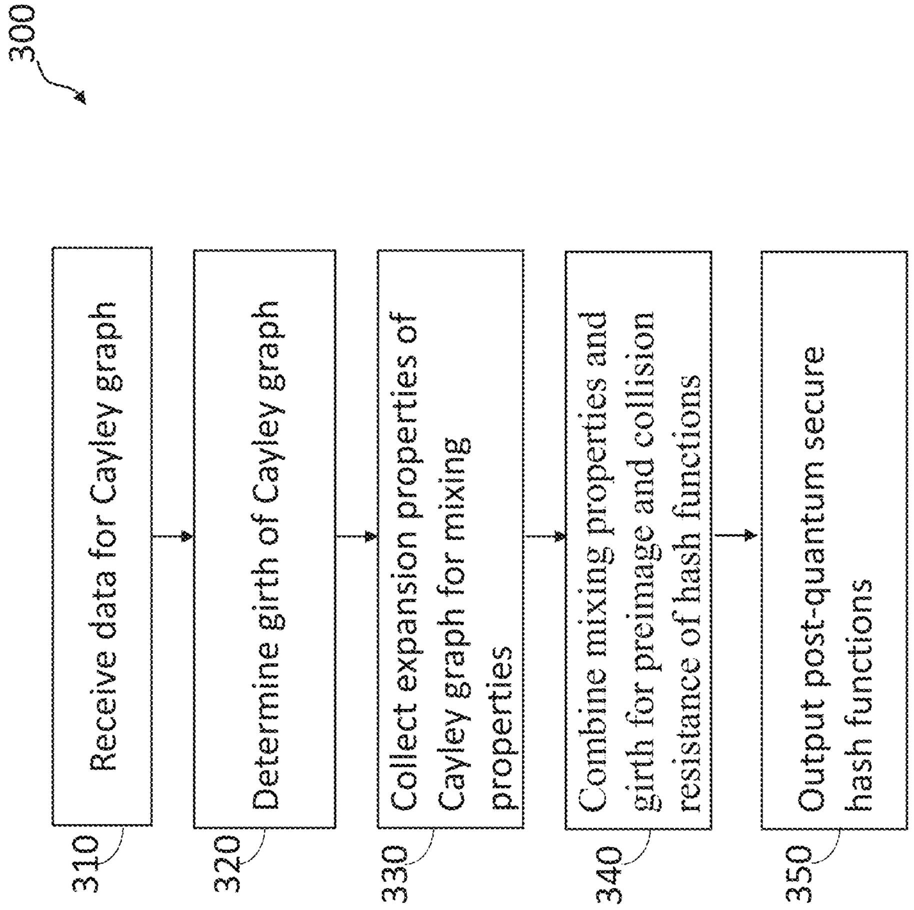
FIG. 3 is a flow diagram of a method for generating a post-quantum hash function, in accordance with some embodiments.

FIG. 3 is a flow diagram of a method 300 for generating a post-quantum hash function, in accordance with some embodiments.

In FIG. 3, graph and group-theoretic machinery are applied to describe the security of the hash functions defined above. The analysis is centered on resistance to preimage and collision breaking, as described above. In sum, a lower bound in the girth of the Cayley graphs of the group SLn(Fp) is established with respect to the generating system $\{A_p\pm1, B_p\pm1\}$. The consequences of girth bounds for collision resistance are described. A resistance to the protocol against an indistinguishability attack is considered.

At step 310, data is received by the quantum-secure hash system for a Cayley graph. At step 320, a girth of the Cayley graph is determined. With regard to a lower bound in the girth, the following proposition is derived from Bromberg, Shpilrain, and Vdovina. "Navigating in the Cayley graph of SL2(Fp) and applications to hashing," incorporated by reference herein.

Proposition 1. Let A,B ∈ $SL_n(Z)$ such that the entries of $A^{\pm1}$ and $B^{\pm1}$ is bounded in absolute value by a positive constant c. If A and B generate a free subgroup of $SL_n(Z)$, then the girth of the Cayley graph of $(A_p,B_p)\leq SL_n(F_p)$, with respect to $$\{A_p^{\pm1}, B_p^{\pm1}\}$$

is at least $$\left\lfloor\frac{\log(p-1)}{\log nc}\right\rfloor.$$

For any reduced word w in $A^{\pm1}$ and $B^{\pm1}$, $w_Z$(resp. $w_{Fp}$)) is written for the projection of w to $SL_n(Z)$ (resp. $SL_n(F_p)$). It follows by a straightforward induction on k that, if w has length k, then the entries of $w_Z$ cannot exceed $(nc)^k$ in absolute value. Now, let l be the girth of the corresponding Cayley graph. Then, there exists a non-trivial reduced word w of length l such that $w_{Fp}=1$. It follows that $w_Z$ is of the form 1+pM, where M is an integer matrix. Since w is non-trivial and since {A,B}generate a rank two free subgroup of $SL_n(Z)$, the matrix M is nonzero. In conclusion, $w_Z$ has an entry of absolute value at least p−1. Since the entries of $w_Z$ cannot exceed $(nc)^k$ in absolute value, the length l of w is bounded below by $$\left\lfloor\frac{\log(p-1)}{\log nc}\right\rfloor,$$

the desired conclusion.

At step 330, expansion properties of the Cayley graph can be collected for mixing properties. As described above, in order to implement the Charles-Lauter-Goren construction, embodiments of the present inventive concept apply the good mixing properties of the expander graphs.

In step 340, the resistance of the model can be analyzed to finding preimages and to collisions. Observe that finding a preimage of a particular hash value (resp. finding a collision of hash values) is equivalent to finding a factorization of a given group element (resp. of the identity) in $SL_n(F_p)$ with respect to the generating set. It is noted that in general, Tillich-Zemor hash functions seem to have robust collision resistance; see "Methods for collisions in some algebraic hash functions" by Simran Tinani. 2023 incorporated by reference herein in its entirety The matrices $A_p,B_p$ involved have order p, so a factorization can be seen as a family of equations $\{(E_m)\}_{m\geq0}$ with variables $$k_1,\ldots,k_m,\ell,\ldots,\ell_m\in F_p$$

satisfying:

$(E_m)\ A^{k1}B^{\ell}\ldots A^{km}B^{\ell m}=M$, for a given challenge M ∈ $SL_n(F_p)$. Note that there are trivial solutions to preimage and collision breaking of the hash function, since $A^{p}_{p}$ is the identity. Since the girth of $G_{n,p}$ is O(logp), considered may be nontrivial solutions to preimage or collision breaking to be ones where $$C_1 \log p \leq \sum_{i=1}^{m} (k_i + \ell_i) \leq C_2 \log p,$$

where $C_1$ and $C_2$ are positive constants depending on n but not on p. Note that estimates for $C_1$ and $C_2$ can be produced, and that Proposition 1 furnishes an estimate for $C_1$, for instance. Sharp values for $C_1$ and $C_2$ are of relatively minor consequence for us.

Each entry of the left-hand side matrix in equation ($E_m$) is polynomial in $k_1, \ldots, k_m \ell_1, \ldots, \ell_m$. Thus, the equation ($E_m$) corresponds to a system of $n^2$ multivariate polynomial equations over Fp.

Solving multivariate polynomial equations over a finite field is known to be NP-hard, see Michael R. Garey and David S. Johnson. Computers and intractability. A Series of Books in the Mathematical Sciences. W. H. Freeman and Co., San Francisco, Calif., 1979. A guide to the theory of NP-completeness incorporated by reference herein in its entirety, which suggests a good level of security. Moreover, the reduction to solving multivariate polynomials, a class of hardness problems considered for standardization by NIST, provides a certain degree of confidence that the hash function is post-quantum (step 350). This approach can be contrasted with schemes based on isogeny graphs, which reduce to a more well-defined problem, albeit one not known to be NP-hard.

NP-hardness of a class of problems is a worst-case complexity property, and for certain NP-hard classes of problems, relatively simple and efficient algorithms can find solutions in the vast majority of cases. Thus, NP-hardness of the underlying problem is not a guarantee of post-quantum behavior of the hash function.

A more compelling case for the hash function to be post-quantum arises from empirical difficulty of factoring in special linear groups over finite fields. For instance, in Jean-Charles Faugere, Ludovic Perret, Christophe Petit, and Gufienafel Renault. New subexponential algorithms for factoring in SL2(F2n). IACR Cryptol. ePrint Arch., page 598, 2011 incorporated by reference herein in its entirety, subexponential factorization algorithms were found for $SL_2(F_2^{\,k})$, and these were only found in 2011. These algorithms rely essentially on the fact that the matrices are 2×2, and on the fact that the underlying field has characteristic two. Thus, the methods do not generalize in any straightforward way to larger dimensional special linear groups nor to fields with odd characteristic. In practice, factoring matrices over finite fields is quite difficult, and implemented algorithms are inefficient. Hardness appears to be optimized when the system of equations resulting from ($E_m$) is neither underdetermined nor overdetermined, i.e. when the number of equations and variables is comparable. Thus, the larger the value of p the more secure the hash function, at the expense of computational time and space, and the balance of degrees of freedom and constraints occurs when $n^2 \sim \log p$, or in other words when n is approximately the square root of the logarithm of p. This is precisely the balance required so that the number of equations and number of variables are comparable, as per the foregoing discussion. One may then expect the factorization problem to take exponential time in the number of variables in this case, and by resistant to the speedup resulting from quantum attacks.

The following is a description how to formalize the relationship between mixing properties and indistinguishability, and how expansion weakens indistinguishability attacks and thus gives heuristic confidence in preimage breaking resistance.

The Mixing Property

A mixing property occurs when the output vertex of a random input, in particular, a random walk, approaches the uniform distribution on the hash space. When the random walk approaches the uniform distribution quickly, mixing is observed even when the input messages have relatively small length, say polynomial in logp. More precisely, the following corollary is a result of Alon-Benjamini-Lubetzky-Sodin Non-backtracking random walks mix faster. Commun. Contemp. Math., 9(4):585{603, 2007, incorporated by reference herein in its entirety, which characterizes the rate at which a random walk on a graph converges to the uniform distribution in terms of the spectral properties of its adjacency matrix:

Theorem 2. Alon-Benjamini-Lubetzky-Sodin, cf Suppose d>2. Let $X_0, X_1, \ldots, X$, be a non-backtracking random walk on a d-regular connected graph G with N vertices. There is a constant C>0 such that whenever $\ell \geq C \cdot \log N$ we have $$|Pr(X = v) - 1/N| \leq 1/N^2, \text{ for every vertex } v \text{ of } G.$$

Examining the proof given in Alon-Benjamini-Lubetzky-Sodin], one finds that the rate of mixing depends not so much on the graph G, as much as on eigenvalues of the adjacency matrix of G. Thus, if G is a member of a sequence $\{G_i\}_{i \in N}$ of expander graphs, the constant C in Theorem 2 can depend only on the expansion constant of the family.

It is well-known that mixing properties are desirable in Tillich-Zémor hashing schemes described for example in Charles, Lauter, and Goren "Cryptographic hash functions from expander graphs" and Tillich and Zémor, "Collisions for the LPS expander graph hash function", each incorporated by reference herein. As explained, mixing is particularly relevant when the hash functions are used in protocols whose security relies on the random oracle model. For examples, see Mihir Bellare and Phillip Rogaway. Random oracles are practical: A paradigm for designing efficient protocols. In Proceedings of the 1st ACM Conference on Computer and Communications Security, CCS '93, page 62-73, New York, NY, USA,1993, Association for Computing Machinery incorporated by reference herein in its entirety.

Surprisingly few mathematical statements addressing the relationship between mixing and attacks are available. However, one example, an example can be found in Bruno Sterner. Commitment schemes from supersingular elliptic curve isogeny graphs. Cryptology ePrint Archive, Report 2021/1031, 2021. Commitment Schemes from Supersingular Elliptic Curve Isogeny Graphs" by Bruno Sterner 2021 incorporated by reference herein in its entirety, in the context of commitment schemes. Proposition 3 below fits in this context.

Proposition 3. Let $\phi: [3]^k \rightarrow SL_n(F_p)$ the special linear group-based hash function described under the General Construction section above, and also let $N = |SL_n(F_p)|$. The special linear group (SL) is over a finite field of an order Fp and n is a dimension of a matrix (n) having a positive integer greater than or equal to 3.

There is a positive constant C such that if $k \geq C \cdot \log N$, and m is taken uniformly in $[_3]^k$ then we have: $|PR(\phi(m)=M)-1/N| \leq 1/N^2$ for every $M \in SL_n(F_P)$.

Multiplicativity and Parallel Computing

The hash functions in accordance with some embodiments, take as input a string of integers, converting each integer into a matrix of the form $\{A^{\pm1}, B^{\pm1}\}$, and finally outputs the product of these matrices.

The fact that the underlying walk is required to be non-backtracking implies that this attribution is not locally determined: a given bit in the string is mapped to a matrix that depends on the previous bits. This dependency can be dramatic: for example, according to the concrete example, a sequence of the form 133 . . . 3 will be mapped to the product B·B·B . . . B, while a sequence of the form 333 . . . 3 will be mapped to the product $B^{-1} \cdot \cdot B^{-1} \cdot B^{31\ 1} \ldots B^{31\ 1}$. In particular, the last bit 3 of these two strings can be mapped to different matrices, depending on the first bit in the string. The endpoints of the corresponding walk in in the Cayley graph may be far away from each other.

As a consequence, the function #need not be multiplicative under concatenation of strings. This lack of multiplicativity makes it difficult to perform parallel computations with the given hash functions.

For a finite set X, the notation X* is used for the set of finite length strings of elements of X. As before, the notation [3] denotes the set {1,2,31.

Definition 4. Let G be a finite group, generated by two elements A and B. Let~$\phi$: [3]*→$\{A^{\pm1}, B^{\pm1}\}$*

A string s ∈ [3]* is called a good tail with respect to ~$\phi$ if there exists S E $\{A^{\pm1}, B^{\pm1}\}$ such that for every $s^0$ ∈ [3]*, the last letter of ~$\phi(s^0 s)$ is S, where here $s^0 s$ is the string obtained from the concatenation of $s^0$ and s. A string which is not a good tail is called a bad tail. Local constraints in Definition under the concrete example herein, can be obtained by another example where The function $\phi^{\sim}$: $\{x_i\} \in [3]^* \rightarrow \{B_i\} \in \{A^{\pm1}, B^{\pm1}\}^*$ constructed in the definition under a concrete example above has the following good tails: 11, 31, 22, 32, 13 and 23.

Proof It is straightforward to check that:

any string ending in 11 or 31 outputs a string ending in A;

any string ending in 22 or 32 outputs a string ending in $A^{-1}$;

any string ending in 13 outputs a string ending in B;

any string ending in 23 outputs a string ending in $B^{-1}$.

The following proposition shows that the attribution above is optimal.

Proposition 4. Special linear group-based hash functions (see Example 1 above) admit at most six good tails of length two.

The bound in Proposition 6 is sharp, as shown via the attributions of Example 1 above. The proof of Proposition 6 will follow from the following lemma:

$$\text{Let} \phi^{\sim}: \{x_i\} \in [3]^* \rightarrow \{B_i\} \in \{A^{\pm1}, B^{\pm1}\}^* \quad \text{Lemma 5.}$$

be a special linear group-based hash function (see Definition under the General Construction section above), and let b ∈ [3]. Then, there exists b' ∈ [3] such that b' b is a bad tail with respect to $\varphi$~.

Proof. The only freedom that we have in the construction of example under the General Construction section above is how the maps $s_i$ are defined. We call elements of $\{A^{\pm1}, B^{\pm1}\}$step matrices. Using ~$\varphi$, we say that the elements of [3] are encoded by step matrices. We summarize the definitions of the maps $s_i$ in a table, with one row for each step matrix, and one column for each element [3]. Each cell from this tabular contains a step matrix.

Description of the maps $s_i$ in Example 1.

| last step matrix | 1 | 2 | 3 |
|---|---|---|---|
| $A^{-1}$ | B | $A^{-1}$ | $B^{-1}$ |
| $B^{-1}$ | A | $A^{-1}$ | $B^{-1}$ |
| A | A | $B^{-1}$ | B |
| B | A | $A^{-1}$ | B |

To use this table, start from a string $\{x_i\} \in [3]^*$. Say that for some i>1, find the step matrix associated with $x_i$. Let S be the step matrix encoding $x_{i-1}$. Then, the step matrix encoding $x_i$ is the step matrix in the cell located in the row labelled by S and in the column labelled by $x_i$.

It follows from the definition of the maps $s_i$ that for each step matrix S, the row labelled by S contains exactly the three matrices in the set $\{A^{\pm1}, B^{\pm1}\}S^{-1}$. The attributions of Definition 6 can be described as in the table above (last step matrix).

Moreover, since each matrix can actually be the last step matrix used, every cell of the table can potentially be used. Fix an element b ∈ [3], and assume for a contradiction that every integer $b^0$∈ [3] has the property that $b^0 b$ is a good tail. The column corresponding to each $b^0$ has to contain at least two different step matrices. This implies that, in the row labelled by b, at least two cells contain the same step matrix. Since this is true for each $b^0$ ∈ [3], this implies in particular that there is a step matrix S that is contained three times in the column labelled by b. The fourth cell of this column cannot be part of the row labelled by S since this would give rise to another S in a different column. This implies that the label $S^0$ of this row appears in a cell of another column. Additionally, this column contains a cell with step matrix not equal to $S^0$. Then, the label $b^0$ ∈ [3] of this column gives us an integer having the property that inputs ending by $b^0 b$ can have either S or another matrix as a final matrix. This is a contradiction and concludes the proof of Lemma 5.

Proof of Proposition 4. From Lemma 5, to each integer of [3] corresponds at least on bad tail, giving three different bad tails. As remarked previously, The definition under the concrete example section shows that the estimate in Proposition 6 is sharp, and so that in some sense, an optimal way is determined of defining the maps $s_i$.

It follows from the discussion of good and bad tails above that multiplicativity of the hash function can be obtained by restricting to sequences whose product ends with the matrix s(1).

In definition under the concrete example section above, we have $\phi(s_1 * s_2) = \phi(s_1) \cdot \phi(s_2)$, provided $s_1$ ends with 22 or 32.

Parallel Computing

Multiplicativity of the hash function under suitable conditions can be leveraged to compute its values by parallel computation. First, look for good tail substrings, namely: 11, 31, 22, 32, 13 or 23. For generic messages, one would expect such substrings to be quite common. Next, split the input immediately following one of these strings, and apply a slightly modified hash function (i.e. using the relevant $s_1$ instead of $s_1$ in the first matrix attribution). Finally, compute the product of the hash outputs.

For example, there may be a desire to hash the string 1321321323. Observe that: 1321321323. Now is computed: $M_1 = \phi(13213)$ and $M_2 = \phi^0(21323)$, where $\phi^0$ is defined analogously to $\phi$ in the definition under the concrete example section above, apart from the fact that $B_1$ is set to be $s_4(x_1)$ instead of $s_1(x_1)$, since $\phi(13213)$ is a product ending by B. Finally, $\phi(1321221323)=M_1 \cdot M_2$.

Palindromic Attacks

One of several proposals of hashing by walks on Cayley graphs can be found in Jean-Pierre Tillich and Gilles Zémor. "Hashing with SL2" In Annual International Cryptology Conference, pages 40-49.Springer, 1994, incorporated by reference herein in its entirety, wherein the Cayley graph is that of $SL_2(F2n)$. A method for finding collisions for this hash function is presented in Markus Grassl, Ivana Ilic, Spyros Magliveras, and Rainer Steinwandt. Cryptanalysis of the Tillich-Zémor hash function. *Journal of cryptology,* 24(1):148-156, 2011 the entirety of which is incorporated by reference herein. Here, such an attack does not apply here. The idea here is to find collisions on palindromes; that is, bitstring entries that are invariant under reversing the order. To begin, one conjugates generators of $SL2(F_{2_n})$ to obtain new generators which give rise to an isomorphic graph, but which are symmetric matrices. That is, if the original generators are $\{A^{\pm 1}, B^{\pm 1}\}$, one finds a matrix C such that $\hat{A}=CAC^{-1}$ and $\hat{B}=CBC^{-1}$ are both symmetric matrices.

First noted is that in this case, finding C is not easy; for $SL_3(5)$ and $SL_3(7)$, about 0.02% of the elements satisfy this criterion. Moreover, there is no obvious way to compute C; attempts to calculate the entries of such a matrix directly have proved resistant to equation solving methods in standard computer algebra systems—indeed, this approach is actually less efficient than just checking all possible matrices. Therefore, not much data is available for larger primes, since the naive method used to find a suitable matrix C quickly becomes computationally infeasible.

Provided one can find a matrix C, it follows that collisions in the hash function with respect to $\tilde{A}$ and $\tilde{B}$ as generators are exactly the collisions with A,B as generators; one can therefore rename the matrices $\tilde{A}$ and $\tilde{B}$ as A,B. One then proceeds according to upon input of a palindromic string v, the output of the product of conjugated generators in $SL_2(F_{2_n})$ will always be a symmetric matrix.

Since the hash function in accordance with embodiments herein requires avoidance of backtracking in the walk, there is no guarantee of a palindromic matrix product from a palindromic input string; however, since one could reverse-engineer the necessary input to obtain a palindromic matrix product, the process proceeds to discuss palindromic matrix products without reference to hash function.

It turns out, as one may check easily by induction, that a palindromic product in symmetric generators will itself be symmetric. The ultimate goal of "Cryptanalysis of the Tillich-Zemor hash function" by Markus Grassl, Ivana Ilic, Spyros Magliveras, and Rainer Steinwandt. Journal of cryptology, 24(1):148{156, 2011, incorporated by reference herein in its entirety. is to use this fact to demonstrate that the function ρ: M 7→AMA+BMB, where M is a palindromic product, outputs a matrix populated with either zeroes or the square of a field element appearing as an entry in M. One then employs number theoretic tricks to force the nonzero elements to 0 in M and thus to obtain ρ(M)=0. One thus builds distinct but equal palindromic matrix products.

Consider the generators from definition under the concrete example section above over $SL_3(F_{11})$. Transforming these generators with respect to the matrix $$C = \begin{pmatrix} 2 & 6 & 10 \\ 5 & 3 & 10 \\ 2 & 3 & 3 \end{pmatrix}$$

one checks that the palindrome M=ABABA is such that $$M = \begin{pmatrix} 7 & 4 & 2 \\ 4 & 0 & 6 \\ 2 & 6 & 6 \end{pmatrix}, \rho(M) = \begin{pmatrix} 2 & 1 & 5 \\ 1 & 1 & 7 \\ 5 & 7 & 7 \end{pmatrix}$$

In particular, for each $i \in [\mathbf{10}]$, the matrix ρ(M) contains an entry that is not the $i^{th}$ power of any entry of M. This furnishes evidence that for p=11, there is little hope of extending Markus Grassl, Ivana Ilic, Spyros Magliveras, and Rainer Steinwandt. "Cryptanalysis of the Tillich-Zémor hash function" incorporated by reference above to this context; an argument can be made that the lack of closed form of transformed generators in general, the difficulty of finding them for larger parameters, and this example with a small value of p, conspire to provide strong evidence that the approach will fail in general.

Figure 4:
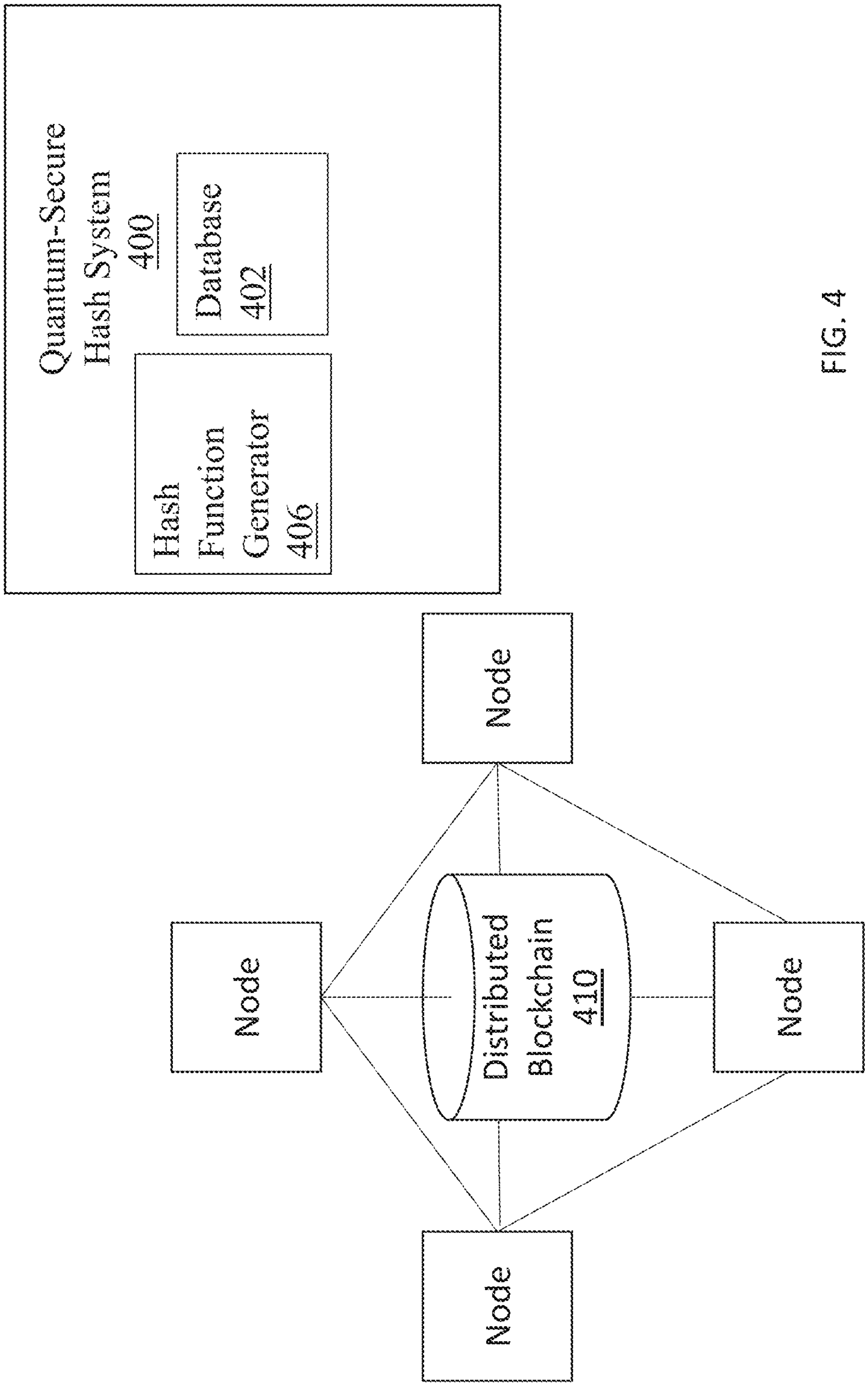
FIG. 4 is a block diagram of a computer system, in accordance with some embodiments.

FIG. 4 is a block diagram of a quantum-secure hash system 400, in accordance with some embodiments. In addition to the components shown in FIG. 4, the quantum-secure hash system 400 can include computer components such as one or more processors, memories, and input/output devices (not shown)

In some embodiments, the quantum-secured hash system 400 can communicate with a blockchain system 410. In some embodiments, the blockchain system 410 comprises multiple nodes amongst which a blockchain is distributed. The blockchain may be similar to or the same as the blockchain described in FIG. 1. The nodes can be managed by multiple different parties and communicate with each other via a communication network. As is well-known, the nodes can coordinate to verify and extend the blockchain 410 by consensus.

The quantum-secure hash system 400 provides hash functions for generating cryptographic keys and hashing the transaction blocks of the blockchain system 410 in a quantum-resistant manner, for example, described in FIGS. 2 and 3. For example, referring to FIG. 1, the hashed text 106 may be used by each block in the blockchain, which includes a block header that contains the hash of the previous block header to ensure that any given block cannot be altered.

In some embodiments, the quantum-secure hash system 400 includes a hash function generator 406 and a database 402.

The hash function generator 406 can be used to implement any of the embodiments discussed herein, for example, some or all of the method 200 of FIG. 2 or method 300 of FIG. 3.

Figure 5:
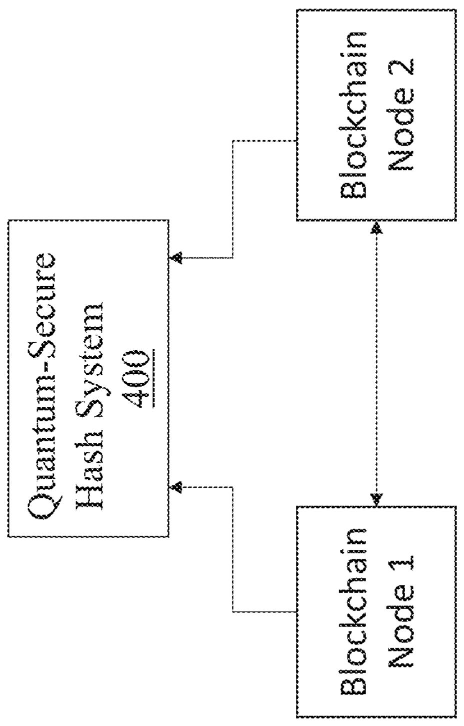
FIG. 5 is a flow diagram of two blockchain nodes joining a quantum attack-resistant blockchain system, in accordance with some embodiments.

As shown in FIG. 5, blockchain nodes 1 and 2 can join a quantum attack resistant blockchain system by communicating with the quantum-secure hash system 400. At least one of the nodes, e.g., Node 1, can obtain a public-private key pair, and encrypt a message according to an encryption algorithm based on coding by using a public key of Node 2, and send the message to Node 2. During a transaction initiated by Node 1 when Node 1 obtains the key pair, Node 1 adopts a hash function from the system 400. The hash function is quantum secure as described above. Node 1 selects a public key to carry out a signature on the hash abstract of the transaction information, and broadcasts the transaction information to all miners in the blockchain system, including Node 2. Node 2 verifies the signature by using a public key ring sent by Node 1. If the verification is successful, the transfer of data according to the transaction occurs.

In sum, embodiments of the present inventive concept include novel Tillich-Zemor hash functions, with platforms Cayley graphs of $SL_n(F_p)$ for n≥3. The technique includes choosing appropriate generating matrices produces graphs without small cycles, and having a quick mixing property, both of which are highly desirable for preimage and collision resistance. Moreover, flexibility of choice of generating matrices and of the dimension n gives the option of increasing the complexity of attacks. Future work includes the exact computation of the spectral gap and the prime p0 (cf. item (i) of the theorem under the Hash Function Definition section herein). Moreover, simulations may be carried out in order to compare with other existing schemes and determine the optimal values of p and n to be taken in implementations.

While the invention has been described with reference to certain embodiments, it will be understood by those skilled in the art that various changes may be made, and equivalents may be substituted for elements thereof to adapt to particular situations without departing from the scope of the disclosure. Therefore, it is intended that the claims are not limited to the particular embodiments disclosed, but that the claims will include all embodiments falling within the scope and spirit of the appended claims.

What is claimed is:

1. A method for securing a blockchain, comprising:
forming a plurality of expander graphs, wherein the expander graphs provide a finite set; and
obtaining from the expander graphs a post-quantum hash function that implements for quantum attack resistance a special linear group over a finite field of an order and a dimension of a matrix having a positive integer greater than or equal to 3; and
applying the post-quantum hash function to cryptographically secure transaction blocks of the blockchain against quantum attacks, wherein the dimension of a matrix having a positive integer greater than or equal to 3 provides collision resistant and preimage resistant features for the hash function.

2. The method of claim 1, where the special linear group is derived from a Tillich-Zémor hash function.

3. The method of claim 1, wherein the expander graph is derived from a Charles-Lauter-Goren scheme.

4. The method of claim 1, wherein the plurality of expander graphs includes Cayley graphs.

5. The method of claim 1, further comprising:
determining a lower bound of a girth of at least one Cayley graph of the plurality of expander graphs of the special linear group SLn(Fp) with respect to a non-symmetric generating set having at least two matrices;
determining a consequence of the bound of the girth for collision resistance; and
using the girth for a nontrivial solution to preimage or collision breaking.

6. The method of claim 5, wherein obtaining the post-quantum hash function comprises the nontrivial solution including multivariate polynomial equations over the finite field.

7. The method of claim 1, wherein a mixing property depends on eigenvalues of an adjacency matrix of the expander graphs.

8. The method of claim 1, further comprising: choosing appropriate generating matrices to produce graphs without small cycles.

9. A method for encrypting a blockchain, including:
generating a post-quantum hash function that implements for quantum attack resistance a special linear group over a finite field of an order and a dimension of a matrix having a positive integer greater than or equal to 3; and
applying the post-quantum hash function to cryptographically secure transaction blocks of the blockchain against quantum attacks, wherein the dimension of a matrix having a positive integer greater than or equal to 3 provides collision resistant and preimage resistant features for the hash function.

10. The method of claim 9, wherein a mixing property depends on eigenvalues of an adjacency matrix of expander graphs.

11. The method of claim 9, further comprising: choosing appropriate generating matrices to produce graphs without small cycles.

12. The method of claim 9, further comprising:
determining a lower bound of a girth of at least one Cayley graph of a plurality of expander graphs of the special linear group SLn(Fp) with respect to a non-symmetric generating set having at least two matrices;
determining a consequence of the bound of the girth for collision resistance; and
using the girth for a nontrivial solution to preimage or collision breaking.

13. The method of claim 12, wherein obtaining the post-quantum hash function comprises the nontrivial solution including multivariate polynomial equations over the finite field.

14. A computer program product, comprising a computer readable hardware storage device storing a computer readable program code, the computer readable program code comprising an algorithm that when executed by a computer processor of a computer system implements a method for securing a blockchain, comprising:
forming a plurality of expander graphs, wherein the expander graphs provide a finite set; and
obtaining from the expander graphs a post-quantum hash function that implements for quantum attack resistance a special linear group over a finite field of an order and a dimension of a matrix having a positive integer greater than or equal to 3; and
applying the post-quantum hash function to cryptographically secure transaction blocks of the blockchain against quantum attacks, wherein the dimension of a matrix having a positive integer greater than or equal to 3 provides collision resistant and preimage resistant features for the hash function.

15. The computer program product of claim 14, where the special linear group is derived from a Tillich-Zémor hash function.

16. The computer program product of claim 14, wherein the expander graph is derived from a Charles-Lauter-Goren scheme.

17. The computer program product of claim 14, wherein the plurality of expander graphs includes Cayley graphs.

* * * * *